United States Patent [19]

Chen et al.

[11] 4,427,606

[45] * Jan. 24, 1984

[54] VAPOR-LIQUID CONTACT GRID

[75] Inventors: Gilbert K. Chen; Paul M. Nyberg; Matthew Buchholz, all of Wichita, Kans.

[73] Assignee: Koch Engineering Company, Inc., Wichita, Kans.

[*] Notice: The portion of the term of this patent subsequent to Jun. 30, 1998 has been disclaimed.

[21] Appl. No.: 421,055

[22] Filed: Sep. 22, 1982

Related U.S. Application Data

[62] Division of Ser. No. 184,141, Sep. 4, 1980, Pat. No. 4,356,611, which is a division of Ser. No. 95,256, Nov. 19, 1979, Pat. No. 4,276,242.

[51] Int. Cl.$^3$ ............... B01D 3/22; B32B 3/10
[52] U.S. Cl. ............... 261/111; 261/DIG. 11; 261/113
[58] Field of Search ............... 261/111, DIG. 11, 112, 261/113; 428/132, 134, 135, 136, 137, 138, 184, 596, 597; 202/158; 29/160, 163.5 R, 157.3 R, 157.3 A, 157.3 B, 157 R, 163.5 F, 455 R

[56] References Cited

U.S. PATENT DOCUMENTS

| | | | |
|---|---|---|---|
| 2,042,127 | 5/1936 | Sayles | 261/112 |
| 2,204,332 | 6/1940 | Trent | 29/157.3 A X |
| 2,420,112 | 5/1947 | Utzler | 29/160 |
| 2,423,896 | 7/1947 | Lave | 29/160 |
| 2,784,953 | 3/1957 | Ng | 202/158 |
| 2,918,995 | 12/1959 | Kruger | 29/160 X |
| 3,286,328 | 11/1966 | Anderson | 29/157.3 B |
| 3,340,341 | 9/1967 | Bruder | 261/112 X |
| 3,343,821 | 9/1967 | Winn et al. | 202/158 X |
| 4,034,135 | 7/1977 | Passmore | 428/184 |

FOREIGN PATENT DOCUMENTS

| | | | |
|---|---|---|---|
| 214351 | 11/1957 | Australia | 29/157.3 B |
| 1341981 | 12/1973 | United Kingdom | 261/111 |

*Primary Examiner*—Charlie T. Moon
*Attorney, Agent, or Firm*—Richard P. Crowley

[57] ABSTRACT

An improved vapor-liquid contact grid apparatus which maximizes the generation of small drops and which is inexpensive to manufacture and easy to construct is disclosed. The grid apparatus consists of multiple layered grids, each grid being formed of upright grid members and connectors. The grid members carry vanes, formed from the member itself by a process of slitting and bending, which vanes extend out into the region between the upright grid members, thus restricting vapor passage, providing drip points and increasing the effective surface area for gas-liquid exchange. The grid members and connectors are arranged in an "egg carton"-like fashion to provide a simple, yet sturdy, grid.

10 Claims, 6 Drawing Figures

VAPOR-LIQUID CONTACT GRID

This is a division of application Ser. No. 184,141, filed Sept. 4, 1980, now U.S. Pat. No. 4,356,611 issued Nov. 2, 1982 which application is a division of Ser. No. 95,296, filed Nov. 19, 1979, now U.S. Pat. No. 4,276,242, issued June 30, 1981.

BACKGROUND OF THE INVENTION

Contact grids are used in many applications where it is necessary to provide efficient exchange between a liquid and a gaseous fluid. One common use is the incorporation of such grids in layer as packing for scrubbing, cooling or distillation towers. In all of these systems, the basic design criteria are the same; the surfaces of the grid should retard the descent of the liquid, create vapor turbulence, and provide additional surface area for gas-liquid contact. At the same time contact grid designs must avoid large pressure drops across the packing and prevent adverse back pressure effects upstream.

Certain prior act contact grids are described in U.S. Pat. No. 3,343,821 issued on Sept. 26, 1967. U.S. Pat. No. 3,343,821 discloses elongated grid members having formations which jut out from the members and, thus, restrict vapor passage therebetween.

One disadvantage of some prior art contact grids has been the complexity and cost associated with the manufacture of the grid elements and contact grids as well as the difficulties encountered in fabricating such contact grids. U.S. Pat. No. 3,343,821 discloses grid members having integral diagonal cross-bars formed by the cutting and bending of the grid members, and describes how such cross-bars may be welded together to form a grid. When grids are so constructed, care must be taken to insure that the grid members are properly cut and bent, and that the welds are clean. Furthermore, it should be apparent that the joints formed by this method have less than optimal mechanical strength insofar as they are free-standing welds.

Prior art contact grids also suffer from a deficiency of drip points or other means to generate small drops of liquid. While contact grids are known to create vapor turbulence and provide additional contact area on their surfaces, the prior art structures are not designed to maximize the number of small drops of liquid, whereby gas-liquid exchange can occur all along the nearly spherical surfaces of the drops.

Therefore, there exists a need for a more efficient, simplified gas-liquid contact grid, which is inexpensive to manufacture and easy to construct. Additionally, there is a need to improve the mechanical strength of grid structures without reliance on expensive, high grade materials.

SUMMARY OF THE INVENTION

The invention disclosed herein is directed to improved gas-liquid contact grids, methods of fabricating such grids and contact apparatus such as towers containing multiple layers of such grids.

It has been discovered that a strong, efficient, economical gas-liquid contact grid for use in tower packings can be made from relatively light weight materials when the elongated contact strips or grid members are joined by connector members in "egg carton"-like fashion. According to this discovery, the grid members are pre-formed with slits extending into the top and bottom of the members; the slits being adapted to receive the connector members, thus permitting horizontal and vertical linkage of the individual contact strips into a multiple layer grid where the grid member and connecting elements are in a defined spatial relationship. Pressure loads on the grid are effectively carried by the connector members and ribs formed in the grid members.

Another aspect of this invention is a simple, new, method of fabricating strip material into grid members having flared tabs or vanes that permit efficient exchange of heat or particulates, or chemical reactions, between liquids and vapors. While most applications of contact grids are in tower packing where exchange takes place between a descending liquid and an ascending vapor, the grids disclosed herein may be used in concurrent flow, perpendicular cross-flow and chemical mixing situations as well. According to our method, a thin narrow strip of material is first slit in a defined manner by any suitable cutting apparatus, and then pressed by a die press or the like to form a grid member having protruding vanes and supporting ribs. The cutting and pressing method disclosed herein is technically simple; standard cutting and pressing equipment may be used. It is also efficient and economical; virtually none of the strip material is wasted.

The vapor-liquid contact apparatus of this invention comprises a plurality of generally parallel, spaced apart, grid members having vanes and ribs. The vanes are formed from the member itself by cutting and bending; once bent, the vanes protrude into the space between the grid member and its neighbors. The interior material of the grid member which remains after the vanes have been bent away, forms a series of ribs which provides strength and support to the member. Each rib carries a slot for receiving a connecting member which serves to link the grid member with its neighbors. The slots in the ribs alternate such that a slot will be found in the top of one rib and then in the bottom of the next rib and again in the top of the following rib, thus linking the grid member with grid layers above and below it. The result is a strong, easy-to construct, multi-layer, contact apparatus.

The method of manufacturing strip material into vane grid members is practiced by cutting "I" shaped incisions into the material. Each "I" cut leaves two tabs of material; each tab being joined to the grid member on only one of its four sides. The tabs are then bent out from the member to form vanes. In the preferred embodiment the cutting and bending is done in one step by a die press with curved surfaces, producing vanes which curve out from the member in opposite directions. It is also preferred that the pattern reverse itself from one "I" cut to the next. Thus, if the upper vane of one cut curves to the left and the lower vane to the right, in the succeeding cut the upper vane should curve to the right and the lower vane to the left.

In another aspect of the invention the longitudinal slit of the "I" cut is serrated or forms a ragged edge. The vanes thus formed from the tabs will have a plurality of drip points. By forming vanes with drip points, the grids disclosed herein serve to maximize the number of small drops of liquid generated and thus provide a greater gas-liquid exchange rate because of the increased surface area of the nearly spherical droplets.

Any number of such alternating vane configurations can be made in a single pressing by proper arrangement of the die press' curved blades. Preferably the same operation which cuts and bends the vane should also cut slots into ribs between vane regions so as to form the alternating top and bottom receiving slots for the connecting members which provide the cross-linkage of the multi-layer grid.

This invention will be described for the purpose of illustration only in connection with certain preferred embodiments, although it is recognized that various modifications may be made without departing from the spirit and scope of the invention. For example, more than one row of paired vanes can be formed in each grid member. Multiple pairs of vanes may be formed in parallel.

DESCRIPTION OF THE EMBODIMENTS

Figure 1A:
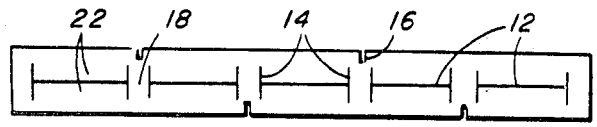
FIGS. 1a–1c are plan views of alternate strip embodiments of the strip material used in fabricating a grid according to the invention.
Figure 1B:
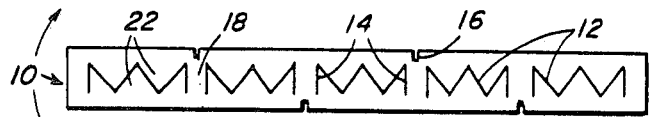
Figure 1C:
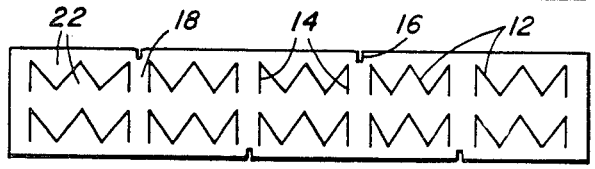

In FIGS. 1a–1c pieces of strip material 10 which have been cut, but not yet shaped, are shown. In FIG. 1a the basic "I" cut is shown. In FIG. 1b the longitudinal slits 12 are serrated and in FIG. 1c two parallel sets of serrated "I" cuts are shown. Strips such as the ones shown are cut to various lengths depending on the cross-sectional area of the tower in which the grid is ultimately employed. In each of these alternatives, longitudinal, medial, cuts 12 have been made into the strip material as well as shorter, transverse cuts 14 which intersect with the ends of each longitudinal cut 12. Together the longitudinal cut 12 and the intersecting transverse cuts form a complete "I" shaped cut, leaving two tabs 22, each tab having three sides which have been freed from the strip material to facilitate the forming of vanes by bending. In addition, the ribs 18 of the strip material 10 in FIGS. 1a–c have been cut to form alternating top and bottom rib slots 16.

Figure 2:
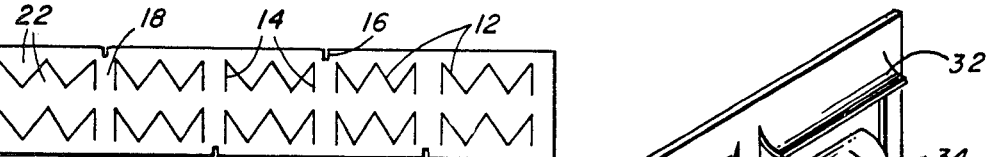
FIG. 2 is a top perspective view of the basic grid structure.

FIG. 2 shows the basic grid structure 40 which consists of a grid member 30 and a connector 20; in use the connector 20 links the grid member 30 to its neighbors. The grid member 30 has been formed from the strip material 10 shown in FIG. 1a. A plurality of curved vanes 32, 34, 36 and 38 have been formd by bending the tabs 22 described above. The pattern of opposing vanes is apparent from the figure. Vane 32, an upper vane, curves to the left while the lower vane 34, formed from the common "I" cut, curves to the right. In the adjacent set of vanes, upper vane 36 curves to the right while lower vane 38 curves to the left. In this embodiment the alternating pattern illustrated by vanes 32, 34, 36, and 38 is repeated throughout each of the grid members.

The linkage between the grid members 30 and connectors 20 is also illustrated in FIG. 2. The width of the connectors is such that they may be fit into the slots 16 carried by the ribs 18 of the grid member 30. The connector 20 shown in FIG. 2 has been fit into slot 16 and serves to connect the grid member 30 not only with its horizontal neighbors but also with its neighbors in the grid layer above. Similarly, a connector (not shown) fits into slot 16 and serves to reinforce the connection of the grid member 30 with its horizontal neighbors as well as provide linkage with the neighboring grid members in the layer below.

Figure 3:
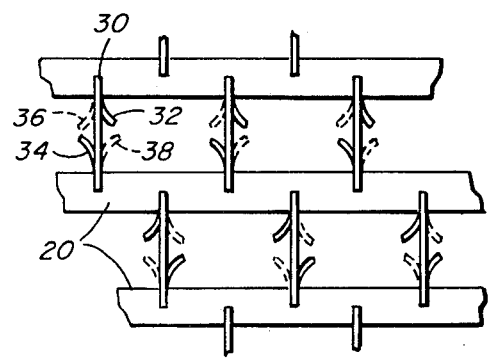
FIG. 3 is an illustrative, partial end view of a multi-layer contact grid formed according to the invention.

In FIG. 3, the cross-linkage between the grid layers is more clearly shown; each connector serves to link two layers of horizontal grids. The advantages of this "egg carton"-like grid arrangement are that a rigid structure is easily formed and that structure is designed to maximize the pressure bearing capability of the materials. Since pressure loads in a tower packing are exhibited primarily in the vertical direction, the egg carton arrangement is particularly suited for multi-layer grids. This arrangement permits the strongest components of the apparatus, the ribs of grid element 30 and the connectors 20, to carry the vertical load.

FIG. 3 also illustrates the basic functions of the vanes, when the grids of our invention are used in vertical tower packings. First, the vanes impede the descent of any liquids sprayed down the towers as well as create turbulence in the ascending vapors. Secondly, as the surfaces of the vanes become wet they provide areas for gas-liquid contact and exchange. Thirdly, the edges of the vanes, particularly when the edges are serrated as shown in FIG. 1b or FIG. 1c, form a plurality of drip points whereby the number of small drops of liquid in the tower is maximized. Finally in the upper regions of the packing, the vanes permit liquid disentrainment from fully moisture-laden vapors, the liquid trickling down the grid for further contact and re-use.

Figure 4:
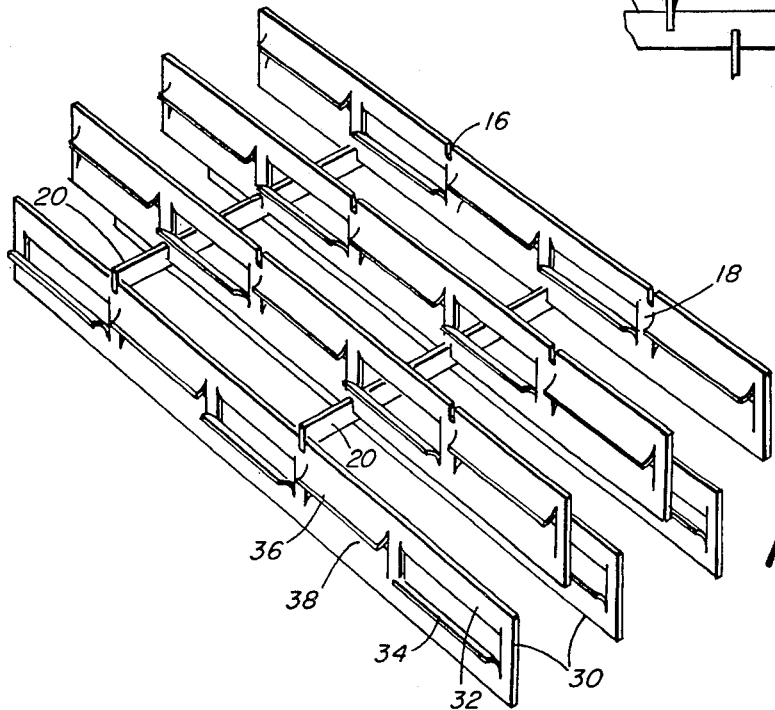
FIG. 4 is an illustrative, partial, perspective view of the multi-layer contact grid.

FIG. 4 is a partial perspective view of two layers of a typical contact grid apparatus constructed in accordance with the invention. The cross linking of the grid members 30 of the two layers is shown as well as the alternating pattern of vanes 32, 34, 36, and 38.

In practice the grid members 30 may be cut and formed in a single operation from a continuous strip of material. The fully formed strip may then be cut to size. Likewise, the connectors may be cut to size from a continuous strip of material. The grid members and connectors are then assembled in an "egg carton"-like fashion into a multi-layer grid. The grid apparatus is then installed into a tower or other suitable chamber for gas-liquid exchanges.

It should be obvious that various changes can be made to the grid apparatus and components described herein without departing from the scope of the invention. For example, the vanes shown herein are curved but various other protrusions from the grid member, forming a perpendicular or oblique angle therewith, would also suffice. Perforation of the strip material before slitting can also be practiced as an alternative to forming serrations or in order to create yet additional drip points. Additionally, the number of connectors used can be more or less than the number shown; each rib of a grid member has the capacity to carry a top and a bottom slot. The dimensions of the members and connectors as well as the spacing there between is all relative to the application.

What we claim is:

1. A vapor-liquid contact grid apparatus which comprises:
   (a) a plurality of grid members positioned in a generally upright and generally parallel, spaced-apart relationship defining a vapor passageway between the upright grid members,
      (i) the grid members composed of a thin, upright grid element, (ii) vanes derived from the grid members and extending transversely outwardly into the vapor passageway from the upright grid members, and (iii) vanes being paired into a plurality of longitudinally spaced sections, so that the vanes of each section are positioned one above the other along the longitudinal length of the grid members, at least one vane of each pair extending outwardly from one side and at least one vane of each pair extending outwardly from the other side to define an opening therebetween, and the vanes of each section separated longitudinally from each adjacent section by upright rib elements of the grid members, the vanes generally of a significantly greater longitudinal length of the grid members than the rib elements therebetween;

(b) a plurality of connectors composed of thin, upright strip elements extending between the grid members, the connectors positioned in a generally spaced-apart and parallel relationship; and (c) means to secure the connectors to the grid members at the rib elements, to form at least one layer of a vapor-liquid grid composed of grid members and connectors in a fixed, spaced-apart relationship.

2. The apparatus of claim 1 wherein the connectors extend generally perpendicular to the upright grid elements.

3. The apparatus of claim 1 wherein the vanes extend in a generally curved fashion, with one of the vanes curved downwardly in one section and the other of the vanes curved generally upwardly in the same section, and the vanes of each section alternating in position along the longitudinal length of the grid elements.

4. The apparatus of claim 1 wherein the vanes have serrated edges, so as to form a plurality of drip points.

5. The apparatus of claim 1 wherein the vanes have perforations, so as to form a plurality of drip points.

6. The apparatus of claim 1 wherein the vertical height of the connectors is substantially less than the vertical height of the upright grid members.

7. The apparatus of claim 1 wherein the means to secure the connectors to the grid members comprises:

(a) a plurality of open slots at the rib elements extending inwardly a short distance from the outer edges of the grid members; and (b) the edges of the connectors positioned in the open slots of the grid members, to form at least one layer of fixed, spaced-apart grid members and connectors.

8. The apparatus of claim 7 wherein the open slots of the grid members are positioned in alternating sequence on the upper and lower edges of the grid members.

9. The apparatus of claim 1 wherein the apparatus comprises a plurality of layers of the grid members and the connectors.

10. A vapor-liquid grid apparatus which comprises:

(a) a plurality of grid members positioned in a generally vertical, upright and generally parallel, spaced-apart relationship, defining a vapor passageway between the upright grid members, the grid members composed of (i) a thin, upright grid element, (ii) vanes derived from the grid member and extending transversely outwardly into the vapor passageway from the upright grid element, (iii) the vanes being paired into a plurality of longitudinally spaced sections, so that the vanes of each section are positioned one above the other along the longitudinal length of the grid members, one vane of each pair extending outwardly from one side and the other vane of each pair extending outwardly from the other side to define an opening therebetween, (iv) the vanes of each section separated longitudinally from each adjacent section by upright rib elements of the grid members, the vanes generally of a significantly longer longitudinal length of the grid member than the rib elements therebetween, (v) the vanes having a series of serrations along their edges which extend into the vapor passageway and form a plurality of drip points, and (vi) the grid elements further characterized by a plurality of open slots at the rib elements extending inwardly a short distance from each outer edge thereof; and (b) a plurality of connectors composed of thin, upright strip elements extending between the grid members and positioned in a generally, spaced-apart and generally parallel relationship, the vertical height of the connectors being substantially less than the vertical height of the upright grid members, and the edges of the connectors positioned in the open slots of the grid elements, to form at least one grid layer of the vapor-liquid grid apparatus composed of grid members and connectors in fixed spaced apart relationship.

* * * * *